United States Patent
Yasusaka

(10) Patent No.: US 10,551,860 B2
(45) Date of Patent: Feb. 4, 2020

(54) REGULATOR FOR REDUCING POWER CONSUMPTION

(71) Applicant: Rohm Co., Ltd., Kyoto (JP)

(72) Inventor: Makoto Yasusaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/258,917

(22) Filed: Jan. 28, 2019

(65) Prior Publication Data

US 2019/0235548 A1 Aug. 1, 2019

(30) Foreign Application Priority Data

Jan. 29, 2018 (JP) .................................. 2018-012858

(51) Int. Cl.
| | | |
|---|---|---|
| *G05F 1/575* | (2006.01) | |
| *G05F 1/565* | (2006.01) | |
| *G05F 1/445* | (2006.01) | |
| *H02M 3/156* | (2006.01) | |

(52) U.S. Cl.
CPC .............. *G05F 1/575* (2013.01); *G05F 1/445* (2013.01); *G05F 1/565* (2013.01); *H02M 3/156* (2013.01)

(58) Field of Classification Search
CPC ... G05F 1/44; G05F 1/445; G05F 1/56; G05F 1/565; G05F 1/575; G05F 1/59; G05F 1/595; H02M 3/156; H02M 3/158
See application file for complete search history.

(56) References Cited

U.S. PATENT DOCUMENTS

| | | | | |
|---|---|---|---|---|
| 6,466,422 B2 * | 10/2002 | Luo | ........................ | G05F 1/575 |
| | | | | 361/18 |
| 6,720,754 B2 * | 4/2004 | Nakashimo | ............. | G05F 1/575 |
| | | | | 323/282 |
| 2010/0097042 A1 * | 4/2010 | Hsieh | ...................... | G05F 1/573 |
| | | | | 323/282 |
| 2016/0187900 A1 * | 6/2016 | Dhiman | .................... | G05F 1/46 |
| | | | | 323/281 |

FOREIGN PATENT DOCUMENTS

| | | | | |
|---|---|---|---|---|
| FR | 2830091 A1 * | 3/2003 | ............. | G05F 1/573 |
| JP | 2013-003699 | 1/2013 | | |

* cited by examiner

*Primary Examiner* — Matthew V Nguyen
(74) *Attorney, Agent, or Firm* — Fish & Richardson P.C.

(57) ABSTRACT

There is provided a regulator including: a first transistor connected between an input terminal and an output terminal; a feedback circuit configured to control a control voltage of a control electrode of the first transistor so that a voltage of the output terminal reaches a target voltage according to a feedback voltage proportional to an output voltage; a second transistor having a control electrode to which the control voltage is applied in common with the first transistor; a first resistor connected with the second transistor in series between the input terminal and the output terminal; and a current limiting circuit configured to detect a voltage generated across the first resistor and to change the control voltage so as to limit a current flowing through the first transistor.

7 Claims, 5 Drawing Sheets

REGULATOR FOR REDUCING POWER CONSUMPTION

CROSS-REFERENCE TO RELATED APPLICATION

This application is based upon and claims the benefit of priority from Japanese Patent Application No. 2018-012858, filed on Jan. 29, 2018, the entire contents of which are incorporated herein by reference.

TECHNICAL FIELD

The present disclosure relates to a regulator.

BACKGROUND

There has been disclosed a semiconductor integrated circuit for a regulator capable of limiting a current at a desired current limiting point even when an output voltage is set to a voltage lower than 1 V.

It is desirable to reduce power consumption even in a semiconductor integrated circuit for a regulator. However, in the semiconductor integrated circuit for a regulator disclosed in the related art, the current flowing through a current detection transistor, which is a current-mirror connected to a voltage control transistor, flows to a ground terminal. Therefore, the current is consumed by the current detection transistor even during a normal use in which an overcurrent does not flow.

SUMMARY

Some embodiments of the present disclosure provide a regulator with reduced power consumption.

According to one embodiment of the present disclosure, there is provided a regulator including: a first transistor connected between an input terminal and an output terminal; a feedback circuit configured to control a control voltage of a control electrode of the first transistor so that a voltage of the output terminal reaches a target voltage according to a feedback voltage proportional to an output voltage; a second transistor having a control electrode to which the control voltage is applied in common with the first transistor; a first resistor connected with the second transistor in series between the input terminal and the output terminal; and a current limiting circuit configured to detect a voltage generated across the first resistor and to change the control voltage so as to limit a current flowing through the first transistor.

According to one embodiment of the present disclosure, the first transistor and the second transistor are P-channel type field effect transistors whose source electrodes are connected to each other. The current limiting circuit includes a third transistor. The third transistor is a P-channel type field effect transistor having a source connected to a drain of the second transistor, and a drain connected to gates of the first transistor and the second transistor, so that a voltage generated across the first resistor is applied between a gate and the source of the third transistor.

According to one embodiment of the present disclosure, the first transistor and the second transistor are P-channel type field effect transistors whose source electrodes are connected to each other. The current limiting circuit includes a third transistor and a circuit configured to increase voltages of gates of the first transistor and the second transistor when the third transistor is turned on. The third transistor is a P-channel type field effect transistor having a source connected to a drain of the second transistor so that a voltage generated across the first resistor is applied between a gate and the source of the third transistor.

According to one embodiment of the present disclosure, the first transistor and the second transistor are P-channel type field effect transistors whose source electrodes are connected to each other. The current limiting circuit includes a third transistor and a circuit configured to control the feedback circuit so as to increase an output of the feedback circuit when the third transistor is turned on. The third transistor is a P-channel type field effect transistor having a source connected to a drain of the second transistor so that a voltage generated across the first resistor is applied between a gate and the source of the third transistor.

DETAILED DESCRIPTION

Figure 1:
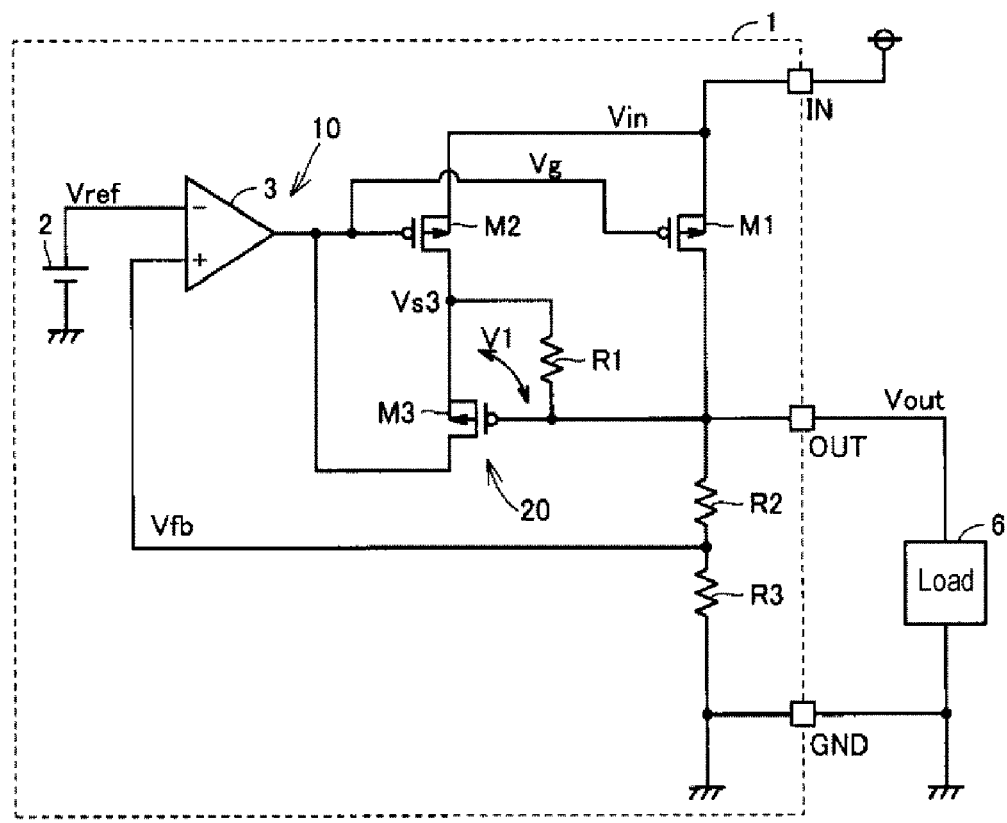
FIG. 1 is a circuit diagram showing a configuration of a regulator according to a first embodiment.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

[Study Example]

Figure 6:
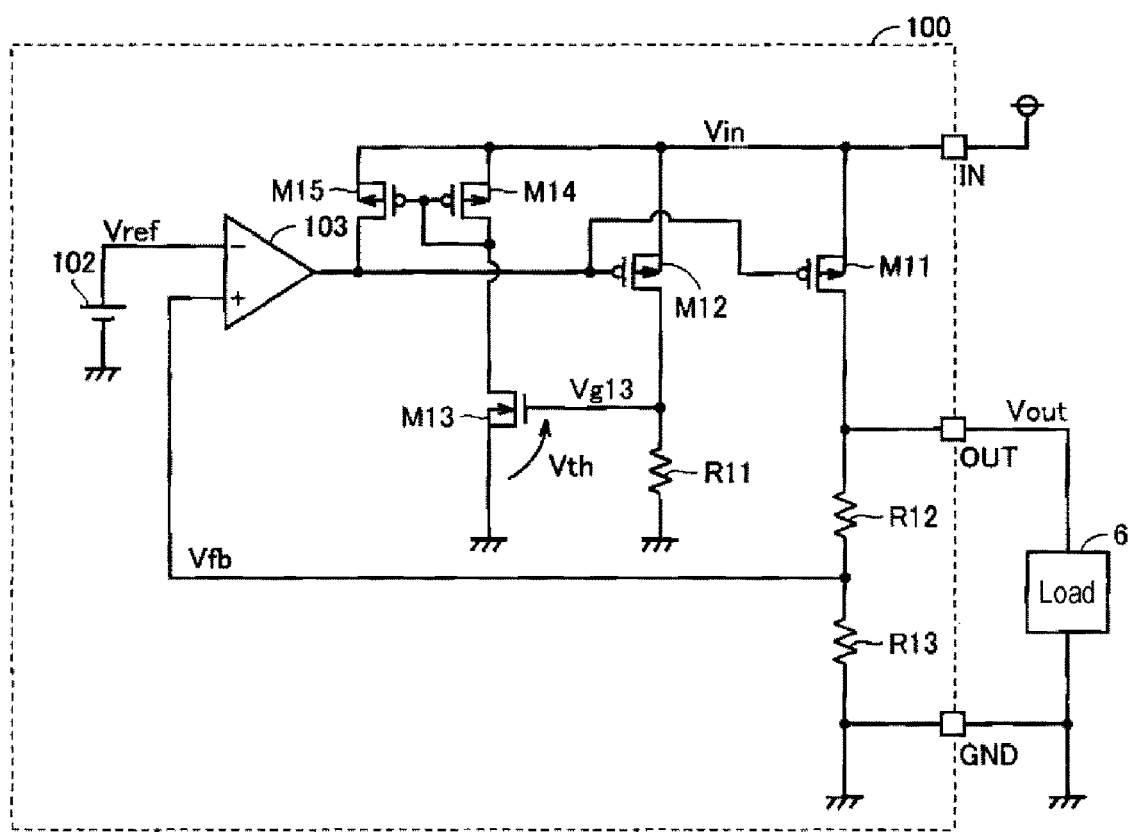
FIG. 6 is a circuit diagram showing a configuration of a regulator of a study example.

Before describing the embodiments, a study example for comparison will be described. FIG. 6 is a circuit diagram showing a configuration of a regulator of the study example.

The regulator 100 of the study example shown in FIG. 6 includes a detection transistor M12 for detecting a current flowing through an output transistor M11. The detection transistor M12 forms a current mirror with the output transistor M11. The transistor size of the detection transistor M12 is designed to be 1/N of the transistor size of the output transistor M11. A current, which is proportional to the current flowing in the output transistor M11, flows in the detection transistor M12. This current is caused to flow through a resistor R11, and a voltage Vg13 is detected by the N-channel type transistor M13.

Therefore, in the regulator 100, when an overcurrent flows to the output transistor M11, the voltage Vg13 becomes higher than a threshold voltage Vth of the N-channel type transistor M13, which allows a current to flow through a transistor M14, and a transistor M15 to be turned on. Accordingly, the gate voltage of the output transistor M11 reaches Vin, whereby the output current is limited.

However, in such a circuit configuration, a current flows from the detection transistor M12 to a ground node via the resistor R11 even during a normal operation in which an overcurrent does not occur. This current increases proportionally as the current of the output transistor M11 increases.

[First Embodiment]

FIG. 1 is a circuit diagram showing a configuration of a regulator according to a first embodiment. The regulator 1 shown in FIG. 1 includes a first transistor M1, a feedback circuit 10, a second transistor M2, a first resistor R1 and a current limiting circuit 20.

The first transistor M1 is connected between an input terminal IN and an output terminal OUT. The feedback circuit 10 controls a control voltage Vg such that a voltage Vout of the output terminal OUT reaches a target voltage according to a feedback voltage Vfb proportional to the output voltage Vout. The control voltage Vg is commonly applied to control electrodes of the second transistor M2 and the first transistor M1. The first resistor R1 is connected in series with the second transistor M2 between the input terminal IN and the output terminal OUT. The current limiting circuit 20 detects a voltage V1 generated across the first resistor R1 and changes the control voltage Vg so as to limit the current flowing through the first transistor M1.

The feedback circuit 10 includes resistors R2 and R3 connected in series to generate a feedback voltage Vfb obtained by dividing the output voltage Vout, and a comparison circuit 3 for outputting the control voltage Vg by receiving the feedback voltage Vfb at a positive input node and receiving a reference voltage Vref at a negative input node.

In the example shown in FIG. 1, the first transistor M1 and the second transistor M2 are P-channel type field effect transistors whose source electrodes are connected to each other. The current limiting circuit 20 includes a third transistor M3. The third transistor M3 is a P-channel type field effect transistor having a source connected to a drain of the second transistor M2 and a drain connected to gates of the first transistor M1 and the second transistor M2, so that the voltage V1 is applied between a gate and the source of the third transistor M3.

In the circuit configuration shown in FIG. 1, the third transistor M3 is a P-channel type field effect transistor. In order to prevent the threshold voltage from being changed due to a substrate bias effect, the source and the back gate of the third transistor M3 are connected to each other. Such a structure can be easily realized by a semiconductor manufacturing process of a commonly-used P-type semiconductor substrate.

Figure 2:
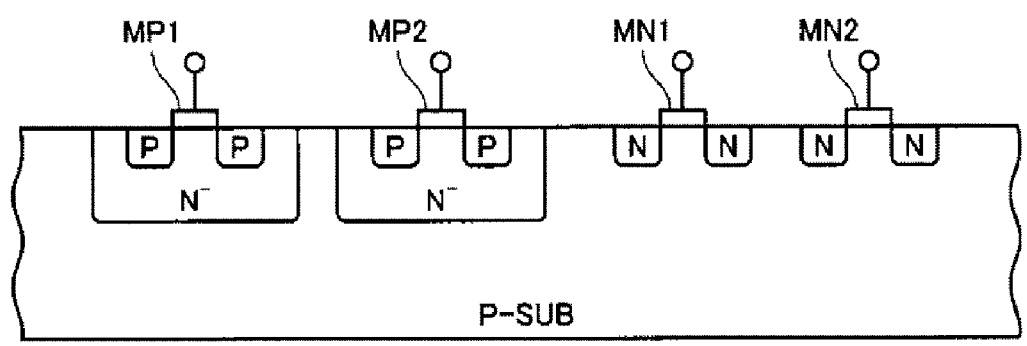
FIG. 2 is a cross-sectional view of a semiconductor device formed by a semiconductor manufacturing process of a P-type semiconductor substrate.

FIG. 2 is a cross-sectional view of a semiconductor device formed by a semiconductor manufacturing process of a P-type semiconductor substrate. As can be seen from the cross-sectional view of the semiconductor device, back gate potentials of N-channel type field effect transistors MN1 and MN2 are a common substrate potential. In contrast, back gate potentials of P-channel type field effect transistors MP1 and MP2 are potentials of N wells formed inside the P-type semiconductor substrate. Therefore, if the N wells are separated, the back gate potentials of the P-channel type field effect transistors MP1 and MP2 can be set to different potentials.

Accordingly, it is easy to set the back gate potentials of the transistors M1 and M2 shown in FIG. 1 to Vin and to set the back gate potentials of the transistor M3 shown in FIG. 1 to Vs3.

Figure 3:
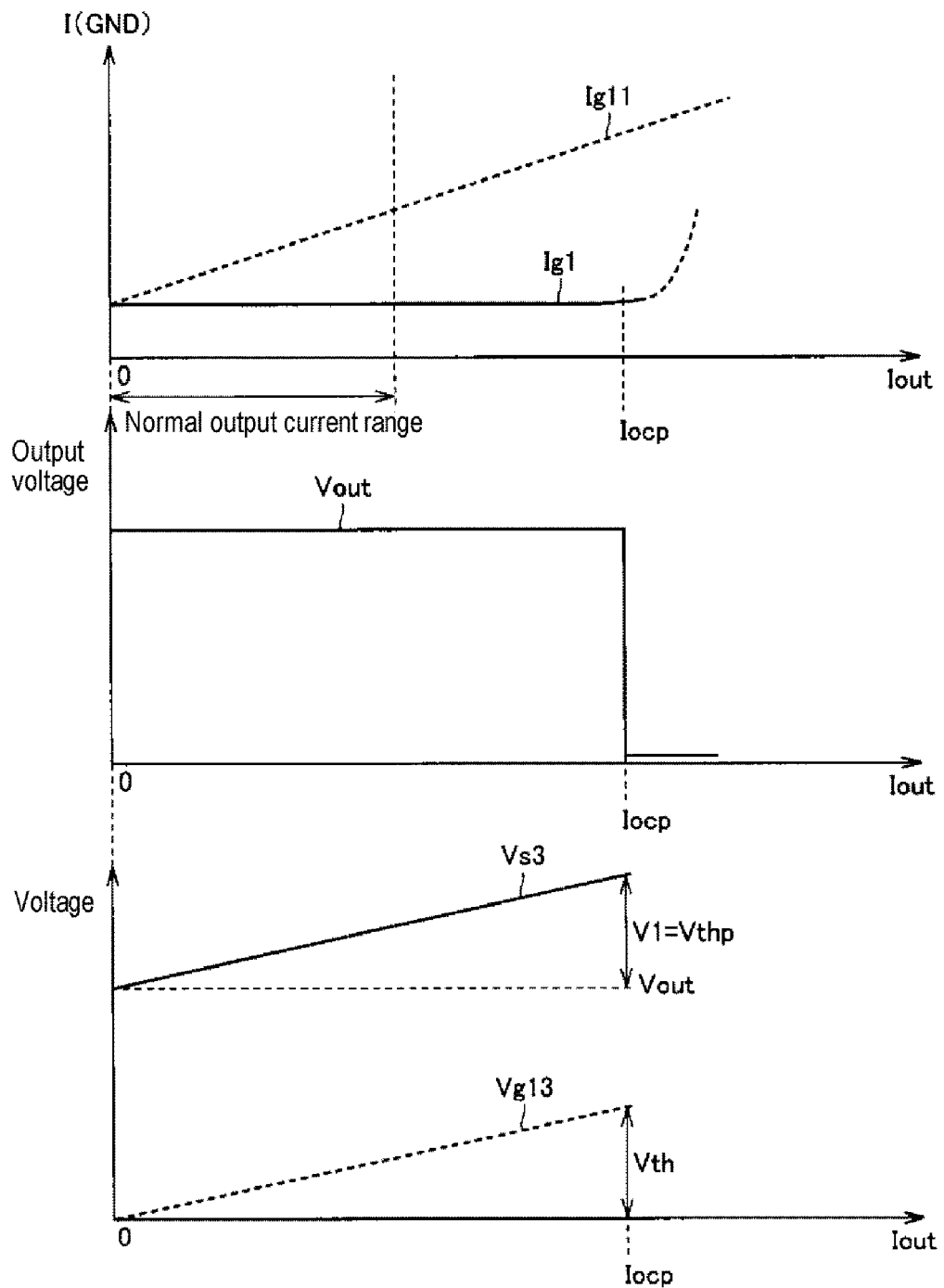
FIG. 3 is a graph showing a comparison of power consumption and voltages of respective parts between a regulator of a first embodiment and a regulator of a comparative example.

FIG. 3 is a graph showing a comparison of the power consumption and the voltages of respective parts between the regulator of the first embodiment and the regulator of a comparative example. In FIG. 3, the horizontal axis indicates a magnitude of a current Iout flowing from an output terminal to a load. In both the regulator 100 of the comparative example and the regulator 1 of the first embodiment, the output voltage Vout is kept constant until the output current Iout reaches an overcurrent Iocp. If the output current Iout exceeds the overcurrent Iocp, a protection function operates and the output voltage Vout decreases.

In the regulator 100 of the comparative example, as the output current Iout increases, the current flowing through the detection transistor M12 also increases in proportion thereto, so that the voltage Vg13 linearly increases from zero volt as a reference. When the output current Iout becomes the overcurrent Iocp, Vg13 exceeds the threshold voltage Vth of the transistor M13. Therefore, the transistor M13 is turned on so that an overcurrent protection function operates.

At this time, even in the normal output current range, the current Ig11 increases in proportion to the increase in the output current Iout. Thus, the current corresponding thereto is wasted.

On the other hand, in the regulator 1 of the first embodiment, as the output current Iout increases, the current flowing through the transistor M2 increases in proportion thereto. Therefore, the voltage Vs3 linearly increases from the output voltage Vout as a reference. When the output current Iout becomes the overcurrent Iocp, since the voltage V1 generated in the resistor R1 exceeds the threshold voltage Vthp of the transistor M3, the transistor M3 is turned on, so that the control voltage Vg also increases and the overcurrent protection function works.

At this time, the current flowing through the resistor R1 in the normal output current range does not flow to a ground node inside the regulator but flows to a load 6 outside the regulator. Therefore, the current flowing through the resistor R1 becomes a part of the current for driving the load 6 and is effectively consumed. Accordingly, the consumption current flowing from the input terminal IN to the ground terminal GND inside the regulator 1 is kept at a constant value as shown in FIG. 3 even if the output current Iout increases.

As described above, according to the regulator shown in the first embodiment, even if the output current Iout increases in the normal use range, the current consumed in the overcurrent protection circuit and the regulator does not increase. Accordingly, it is possible to realize a regulator whose power consumption is reduced as compared with the conventional one.

[Second Embodiment]

Figure 4:
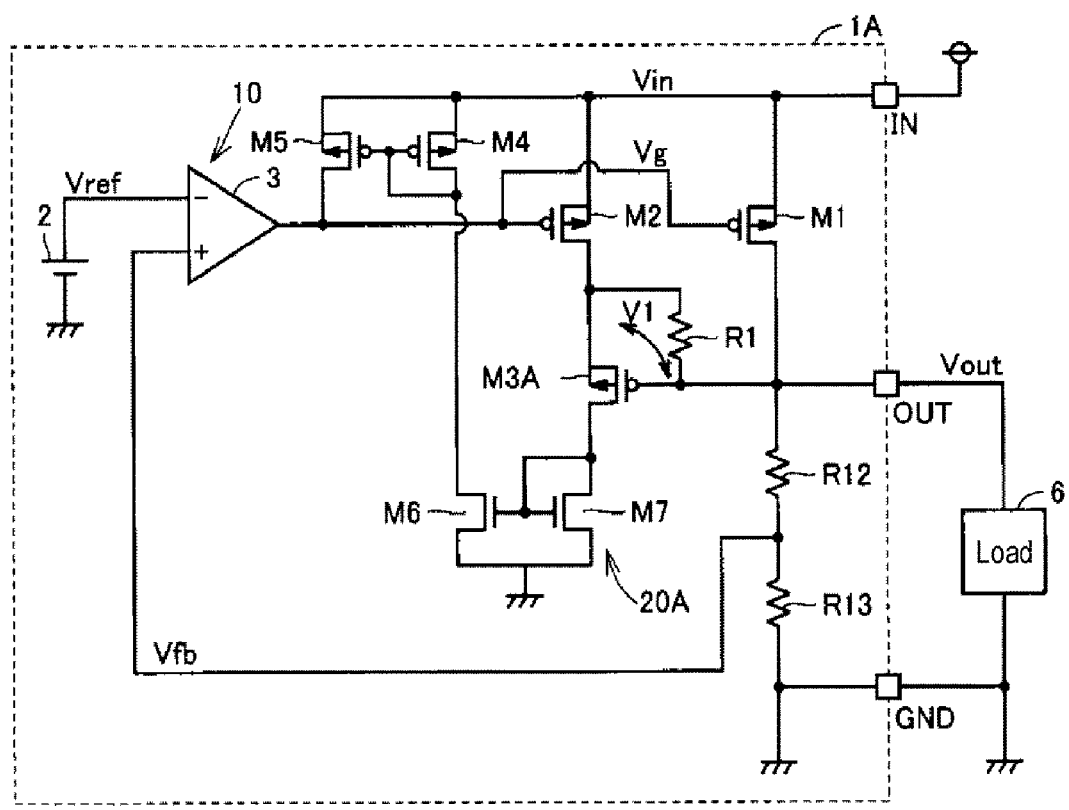
FIG. 4 is a circuit diagram showing a configuration of a regulator according to a second embodiment.

FIG. 4 is a circuit diagram showing a configuration of a regulator according to a second embodiment. The regulator 1A shown in FIG. 4 includes a first transistor M1, a feedback circuit 10, a second transistor M2, a first resistor R1 and a current limiting circuit 20A.

The first transistor M1, the feedback circuit 10, the second transistor M2 and the first resistor R1 are the same as those of the first embodiment and, therefore, the description thereof will not be repeated.

The current limiting circuit 20A detects the voltage generated across the first resistor R1 and changes the control voltage Vg so as to limit the current flowing through the first transistor M1.

The current limiting circuit 20A includes a third transistor M3A and a circuit for increasing the voltages Vg of the gates of the first transistor M1 and the second transistor M2 when the third transistor M3A is turned on.

This circuit is configured to include N-channel type field effect transistors M6 and M7 and P-channel type field effect transistors M4 and M5.

The third transistor M3A is a P-channel type field effect transistor having a source connected to a drain of the second transistor M2 so that a voltage V1 generated across the first resistor R1 is applied between a gate and the source of the third transistor M3A.

When an overcurrent is detected and the third transistor M3A is turned on, a current flows through the transistor M7. This current causes the transistor M5 to be turned on by a two-stage current mirror. Accordingly, the control voltage Vg increases and, therefore, the current of the output transistor M1 decreases.

Even in the configuration of the regulator 1A, before an overcurrent is detected, the transistor M3A is in an OFF state and no current flows to a ground node inside the current limiting circuit 20A. Thus, according to the regulator shown in the second embodiment, even if the output current Iout increases in the normal use range, the current consumed in the overcurrent protection circuit and the regulator does not increase. Accordingly, it is possible to realize a regulator whose power consumption is reduced as compared with the conventional one.

[Third Embodiment]

Figure 5:
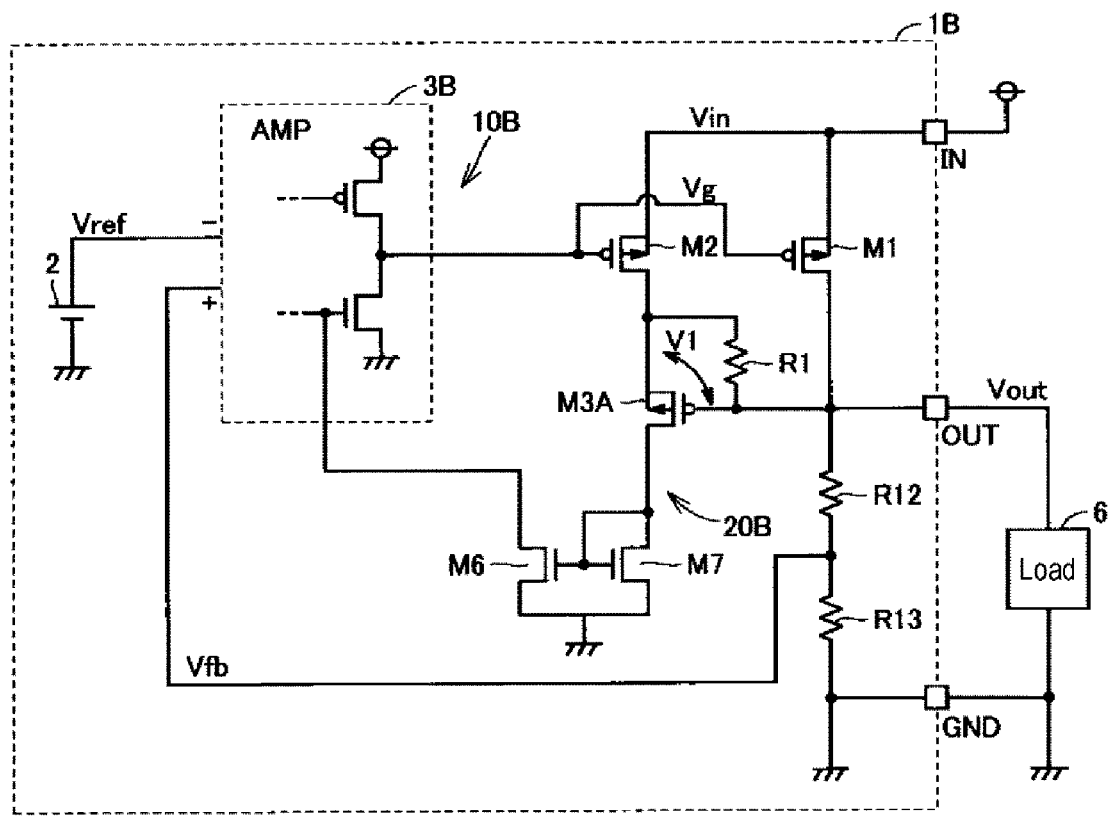
FIG. 5 is a circuit diagram showing a configuration of a regulator according to a third embodiment.

FIG. 5 is a circuit diagram showing a configuration of a regulator according to a third embodiment. The regulator 1B shown in FIG. 5 includes a first transistor M1, a feedback circuit 10B, a second transistor M2, a first resistor R1 and a current limiting circuit 20B.

The first transistor M1, the second transistor M2 and the first resistor R1 are the same as those of the first embodiment and, therefore, the description thereof will not be repeated.

The feedback circuit 10B includes resistors R2 and R3 connected in series to generate a feedback voltage Vfb obtained by dividing the output voltage Vout, and a comparison circuit 3B for outputting a voltage Vg by receiving the feedback voltage Vfb at a positive input node and receiving a reference voltage Vref at a negative input node. The comparison circuit 3B is configured such that the transistor on the ground potential output side of the last stage of the output is forcibly turned off by the current limiting circuit 20B.

The current limiting circuit 20B includes a third transistor M3A and a circuit for controlling the feedback circuit 10B so as to increase the output of the feedback circuit 10B when the third transistor M3A is turned on. This circuit is configured to include N-channel type field effect transistors M6 and M7.

The third transistor M3A is a P-channel type field effect transistor having a source connected to a drain of the second transistor M2 so that a voltage V1 generated across the first resistor R1 is applied between a gate and the source of the third transistor M3A.

When an overcurrent is detected and the third transistor M3A is turned on, a current flows through the transistor M7. This current causes the transistor M6 to be turned on by a current mirror. Accordingly, the control voltage Vg increases in order to turn off the N-channel type field effect transistor of the last stage of the comparison circuit 3B. Therefore, the current of the output transistor M1 decreases.

Even in the configuration of the regulator 1B, before an overcurrent is detected, the transistor M3A is in an OFF state and no current flows to a ground node inside the current limiting circuit 20B. Therefore, according to the regulator shown in the third embodiment, even if the output current Iout increases in the normal use range, the current consumed in the overcurrent protection circuit and the regulator does not increase. Accordingly, it is possible to realize a regulator whose power consumption is reduced as compared with the conventional one.

It should be appreciated that the embodiments disclosed herein are exemplary in all respects and are not restrictive. The scope of the present disclosure is defined not by the description of the embodiments described above but by the claims. It is intended that the scope of the present disclosure includes all modifications within the meaning and scope equivalent to the claims.

According to the regulator of the present disclosure, it is possible to reduce power consumption, inasmuch as the current for current detection does not flow to the ground terminal during the normal use in which an overcurrent does not occur.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A regulator, comprising:
   a first transistor connected between an input terminal and an output terminal;
   a feedback circuit configured to control a control voltage of a control electrode of the first transistor so that a voltage of the output terminal reaches a target voltage according to a feedback voltage proportional to an output voltage;
   a second transistor having a control electrode to which the control voltage is applied in common with the first transistor;
   a first resistor connected with the second transistor in series between the input terminal and the output terminal; and
   a current limiting circuit including a third transistor having a source connected to a drain of the second transistor, and configured to apply a voltage generated across the first resistor between a gate and the source of the third transistor, and to change the control voltage so as to limit a current flowing through the first transistor when the third transistor is turned on.

2. The regulator of claim 1, wherein the first transistor and the second transistor are P-channel type field effect transistors whose source electrodes are connected to each other, and
   wherein the third transistor is a P-channel type field effect transistor having a drain connected to gates of the first transistor and the second transistor.

3. The regulator of claim 1, wherein the first transistor and the second transistor are P-channel type field effect transistors whose source electrodes are connected to each other, and
   wherein the third transistor is a P-channel type field effect transistor, and the current limiting circuit includes a circuit configured to increase voltages of gates of the first transistor and the second transistor when the third transistor is turned on.

4. The regulator of claim 1, wherein the first transistor and the second transistor are P-channel type field effect transistors whose source electrodes are connected to each other, and wherein the third transistor is a P-channel type field effect transistor, and the current limiting circuit includes a circuit configured to control the feedback circuit so as to increase an output of the feedback circuit when the third transistor is turned on.

5. A regulator, comprising:
a first transistor connected between an input terminal and an output terminal;
a feedback circuit configured to control a control voltage of a control electrode of the first transistor so that a voltage of the output terminal reaches a target voltage according to a feedback voltage proportional to an output voltage;
a second transistor having a control electrode to which the control voltage is applied in common with the first transistor;
a first resistor connected with the second transistor in series between the input terminal and the output terminal; and
a current limiting circuit configured to detect a voltage generated across the first resistor and to change the control voltage so as to limit a current flowing through the first transistor,
wherein the first transistor and the second transistor are P-channel type field effect transistors whose source electrodes are connected to each other,
wherein the current limiting circuit includes a third transistor, and
wherein the third transistor is a P-channel type field effect transistor having a source connected to a drain of the second transistor, and a drain connected to gates of the first transistor and the second transistor, so that the voltage generated across the first resistor is applied between a gate and the source of the third transistor.

6. A regulator, comprising:
a first transistor connected between an input terminal and an output terminal;
a feedback circuit configured to control a control voltage of a control electrode of the first transistor so that a voltage of the output terminal reaches a target voltage according to a feedback voltage proportional to an output voltage;
a second transistor having a control electrode to which the control voltage is applied in common with the first transistor;
a first resistor connected with the second transistor in series between the input terminal and the output terminal; and
a current limiting circuit configured to detect a voltage generated across the first resistor and to change the control voltage so as to limit a current flowing through the first transistor,
wherein the first transistor and the second transistor are P-channel type field effect transistors whose source electrodes are connected to each other, and
wherein the current limiting circuit includes a third transistor as a P-channel type field effect transistor having a source connected to a drain of the second transistor so that the voltage generated across the first resistor is applied between a gate and the source of the third transistor, and a circuit configured to increase voltages of gates of the first transistor and the second transistor when the third transistor is turned on.

7. A regulator, comprising:
a first transistor connected between an input terminal and an output terminal;
a feedback circuit configured to control a control voltage of a control electrode of the first transistor so that a voltage of the output terminal reaches a target voltage according to a feedback voltage proportional to an output voltage;
a second transistor having a control electrode to which the control voltage is applied in common with the first transistor;
a first resistor connected with the second transistor in series between the input terminal and the output terminal; and
a current limiting circuit configured to detect a voltage generated across the first resistor and to change the control voltage so as to limit a current flowing through the first transistor,
wherein the first transistor and the second transistor are P-channel type field effect transistors whose source electrodes are connected to each other, and
wherein the current limiting circuit includes a third transistor as a P-channel type field effect transistor having a source connected to a drain of the second transistor so that the voltage generated across the first resistor is applied between a gate and the source of the third transistor, and a circuit configured to control the feedback circuit so as to increase an output of the feedback circuit when the third transistor is turned on.

* * * * *